United States Patent [19]

Bradfield

[11] Patent Number: 4,928,322
[45] Date of Patent: May 29, 1990

[54] DISPOSABLE GLOVE
[75] Inventor: Athoi G. Bradfield, Edmonton, Canada
[73] Assignee: Bradfield AG Inc., Seattle, Wash.
[21] Appl. No.: 223,090
[22] Filed: Jul. 22, 1988
[51] Int. Cl.⁵ .......................................... A41D 19/00
[52] U.S. Cl. ............................................ 2/169; 2/158; 2/163
[58] Field of Search ................... 2/158, 159, 163, 167, 2/168, 169; 156/182, 308.4, 324.4; 15/227

[56] References Cited

U.S. PATENT DOCUMENTS

| | | |
|---|---|---|
| 1,469,029 | 9/1923 | Underwood et al. ............. 15/227 |
| 1,782,502 | 11/1930 | Crane .............................. 15/227 |
| 1,817,385 | 8/1931 | Marks .............................. 2/158 |
| 2,034,609 | 3/1936 | Creese et al. ..................... 2/167 |
| 2,391,263 | 12/1945 | Morton ............................ 2/20 |
| 2,460,460 | 2/1949 | Langer ........................... 156/308.4 |
| 2,611,901 | 10/1952 | Neider ............................ 2/158 |
| 2,790,982 | 5/1957 | Schneider ........................ 15/125 |
| 2,898,973 | 8/1959 | Marsh ........................ 156/308.4 X |
| 2,976,540 | 3/1296 | Sutherland ...................... 2/161 |
| 3,028,576 | 4/1962 | Gerard ........................... 156/251 |
| 3,151,333 | 10/1964 | Scholz ............................ 2/161 |
| 3,229,875 | 1/1966 | Stoller .......................... 2/169 X |
| 3,327,320 | 6/1967 | Forsyth .......................... 2/158 |
| 3,329,548 | 7/1967 | Blatz ............................. 156/251 |
| 3,625,790 | 12/1971 | Ayres ............................. 156/93 |
| 3,675,264 | 7/1972 | Storandt ...................... 15/104.94 |
| 3,866,245 | 2/1975 | Sutherland ...................... 2/169 |
| 3,923,577 | 12/1975 | Baab ............................. 156/251 |
| 4,034,853 | 7/1977 | Smith ............................ 206/278 |
| 4,065,826 | 1/1978 | Hough ........................... 15/227 |
| 4,071,921 | 2/1978 | Jury .............................. 2/158 |
| 4,122,554 | 10/1978 | Stager ........................... 2/164 |
| 4,185,330 | 1/1980 | Stager ........................... 2/164 |
| 4,214,321 | 7/1980 | Nuwayser ....................... 2/167 |
| 4,240,157 | 12/1980 | Peters ........................... 2/161 R |
| 4,283,244 | 8/1981 | Hashmi .......................... 2/164 X |
| 4,476,588 | 10/1984 | Long ............................. 2/169 |
| 4,581,088 | 4/1986 | House ........................... 156/219 |
| 4,604,759 | 8/1986 | Bowman et al. .................. 2/81 |
| 4,677,697 | 7/1987 | Hayes ........................... 2/169 X |
| 4,745,635 | 5/1988 | Kinnear ......................... 2/161 R |

FOREIGN PATENT DOCUMENTS

| | | | |
|---|---|---|---|
| 662266 | 4/1965 | Belgium ........................... 2/169 |
| 234480 | 9/1923 | Canada . | |
| 352878 | 9/1935 | Canada . | |
| 419506 | 4/1944 | Canada . | |
| 435723 | 7/1946 | Canada . | |
| 752591 | 2/1967 | Canada ........................... 15/227 |
| 1062403 | 9/1979 | Canada . | |
| 429572 | 10/1962 | Fed. Rep. of Germany ......... 2/169 |
| 1815639 | 10/1973 | Fed. Rep. of Germany ......... 2/167 |
| 2196820 | 3/1974 | France .......................... 15/227 |
| 2542980 | 9/1984 | France . | |
| 1031176 | 2/1986 | Japan ............................ 2/243 A |
| 2078091 | 1/1982 | United Kingdom ................ 2/158 |
| 2114871 | 9/1983 | United Kingdom ................ 2/158 |
| 2134371 | 8/1984 | United Kingdom ................ 2/159 |

Primary Examiner—Werner H. Schroeder
Assistant Examiner—Sara M. Current

[57] ABSTRACT

A method of converting sheet material into gloves consisting of the steps of arranging sheet material with two inner plys of thermoplastic between outer plys of tissue. Then, applying heat to one of the outer plys of tissue in the outline of a glove, such that the inner plys of thermoplastic bond the plys of sheet material together to form a glove with an opening along one side to permit hand entry. An apparatus for use in converting sheet material into gloves consisting of a body and an electrically heated metal plate mounted on the body with at least one opening in the shape of a glove. "C" clamps are hinged to the body such that the body may be mounted to a thermally insulated surface and moved between a position where the plate engages the surface, and a position where the plate is spaced from the surface. A disposable glove consisting of two inner plys of thermoplastic sheet material between outer plys of tissue sheet material, sealed together to form a glove with an opening along one side to permit hand entry.

18 Claims, 3 Drawing Sheets

DISPOSABLE GLOVE

The present invention relates to a disposable glove, together with a method and apparatus for manufacturing the same.

BACKGROUND OF THE INVENTION

There are numerous applications in our society where a covering for the hand is required. One example is for the serving of bakery goods, as the clerk does not wish to be seen to directly handle the customer's purchase. This need is presently being fulfilled by the clerk placing his or her hand in a polyethylene bag. There are many disadvantages to using a bag. It is often difficult to find the opening in which one is to insert ones hand. The bag falls off the hand, often at an inopportune moment, and it is difficult to manipulate articles properly.

The obvious solution to the problem is to form the polyethylene into a glove which will conform to the hand and be disposable when the task is completed. This has not been accomplished due to a number of problems. One problem is that upon application of heat to a thin film of polyethylene to form a glove, the polyethylene film disintegrates. The use of alternate materials has proven too costly, which inhibits use as a "disposable" glove. Another problem is one of functional design, as the attempts to resolve the problem have tended to be inferior products which add an additional problem of tearing to the problems inherent in plastic bags.

SUMMARY OF THE INVENTION

What is required is a method of making thermoplastic material into disposable gloves. What is required is a glove that can readily be placed upon the hand and once in place will stay there and permit a full range of hand function.

According to one aspect of the invention there is provided a method of converting sheet material into gloves, which is comprised of the steps of arranging sheet material with two inner plys of thermoplastic between outer plys of tissue. Then, applying heat to one of the outer plys of tissue in the outline of a glove, such that the inner plys of thermoplastic bond the plys of sheet material together to form a glove with an opening along one side to permit hand entry.

Although beneficial results may be obtained through use of the method described, the sheet material between the digits will form a web like a baseball glove that restricts movement, and the glove will not be universal in fit. Consequently, even more beneficial results can be achieved, if the preferred features are added of having the glove in the form of a mitten, and including the further step of cutting an arcuate cut from the inside of the thumb to the side of the sheet material adjacent the thumb, thereby facilitating movement of the thumb.

According to another aspect of the invention there is provided an apparatus for use in converting sheet material into gloves which is comprised of a body; and a metal plate mounted on the body with at least one opening in the shape of a glove. Means are provided for heating the plate. Means are provided for pivotally mounting the body such that the body may be mounted to a thermally insulated surface and moved between a position where the plate engages the surface, and a position where the plate is spaced from the surface.

According to another aspect of the invention there is provided a disposable glove which is comprised of two inner plys of thermoplastic material between outer plys of tissue sheet material, sealed together to form a glove with an opening along one side to permit hand entry.

Although beneficial results may be obtained through use of the disposable glove described, as previously mentioned, the sheet material between the digits will form a web like a baseball glove that restricts movement, and the glove will not be universal in fit. Even more beneficial results can be achieved, therefore, if the preferred features are added of having the glove in the form of a mitten having a perforated arcuate cut from the inside of the thumb to the side of the sheet material adjacent the thumb, thereby facilitating movement of the thumb.

Although beneficial results may be obtained from using the described disposable glove, even more beneficial results may be obtained if the opening to the glove is modified in accordance with the preferred embodiment to facilitate entry of a hand into the opening. This can be accomplished by adding to the described disposable glove the preferred feature of the opening having a first side and a second side, the plys of sheet material on the first side of the opening being longer than the plys of sheet material on the second side of the opening, thereby forming an extension.

Although beneficial results may be obtained from using the described disposable mitt, even more beneficial results may be obtained if for the convenience of the consumer the disposable mitts are dispensed in rolls. If the gloves are designed in pairs the thumbs can be placed in an extended position which prolongs the effective life of the glove. According to this aspect of the invention there is provided a disposable glove which is comprised of a roll of two inner plys of thermoplastic sheet material between outer plys of tissue sheet material, sealed together to form pairs of mittens, the roll having opposed sides, each pair of mittens having interlocking thumbs and being separated by perforations, openings to permit hand entry into the mittens being along the sides of the roll, each pair of mittens being separated from an adjoining pair of mittens by perforations.

Although beneficial results may be obtained from using the described disposable mitt, even more beneficial results may be obtained if modifications are made to the outer ply of tissue material to make it particularly suited for a selected usage. By way of example, the outer tissue can be made of an absorbent material for delicate cleaning jobs, or abrasive material for use when scrubbing. The tissue can also be treated with a variety of chemicals to alter it's properties. By way of example, the tissue could be treated with a fire retardant for use when working with gasoline or other flamables.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
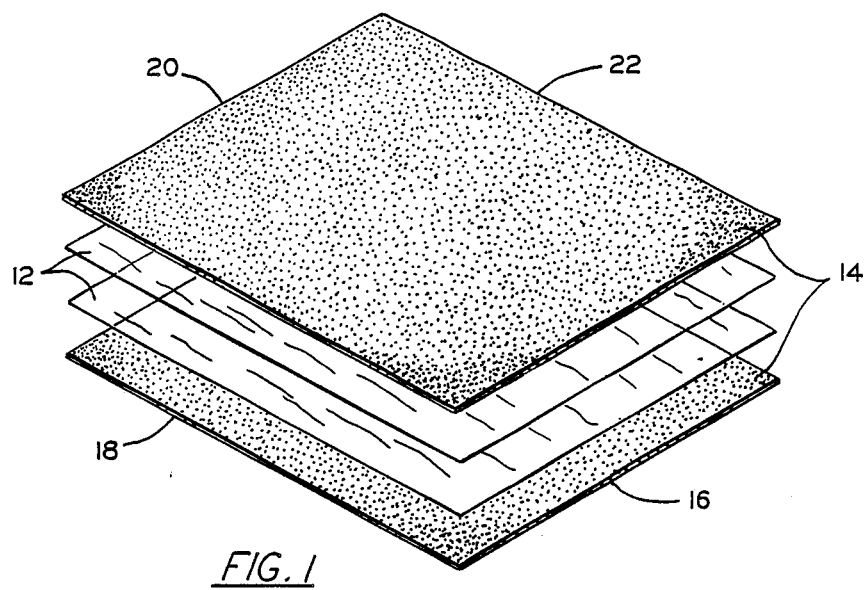
FIG. 1 is a perspective view illustrating a first step of the preferred method.
Figure 2:
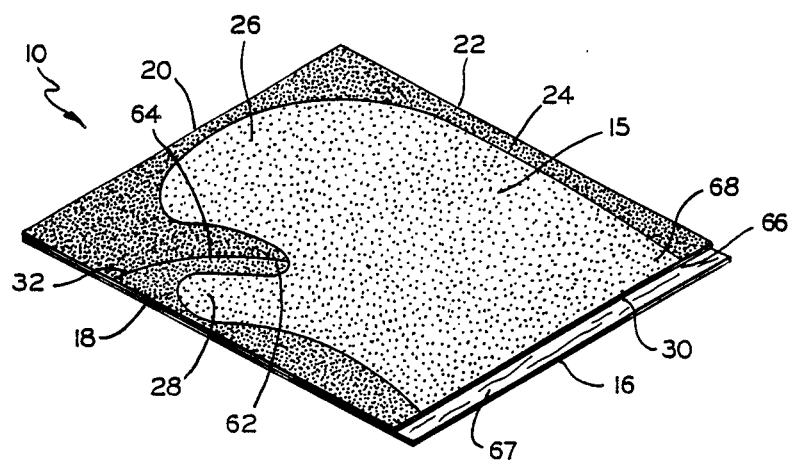
FIG. 2 is a perspective view of a preferred embodiment of a disposable glove made in accordance with the invention.

The preferred method will now be described with reference to FIGS. 1 and 2. The preferred apparatus which is used in carrying out the method will now be described with reference to FIGS. 3 and 4. The preferred embodiment, generally designated by reference numeral 10, is a disposable glove, which will now be described with reference to FIG. 2. Variations of disposable glove 10 will be described with reference to FIGS. 5 and 6.

The preferred method permits thermoplastic sheet material 12 and tissue sheet material 14 to be made into gloves 10 and consists of the following described steps. Firstly, referring to FIG. 1, arranging sheet material 12 and 14 such that there are two inner plys of thermoplastic 12 between outer plys of tissue 14. For the purpose of this description, the four sides of the rectangular sheet material illustrated shall be designated by numerals 16, 18, 20, and 22. Secondly, applying heat to one of the outer plys of tissue 14 in the outline of a mitten 24, such that the inner plys of thermoplastic 12 bond the plys of sheet material 12 and 14. Once sheet materials 12 and 14 bond together, an unsealed pocket 15 is formed. Pocket 15 is in the outline of mitten 24 with a finger portion 26, and a thumb portion 28, as illustrated in FIG. 2. Pocket 15 has an unsealed opening 30 along side 16 to permit hand entry. Thirdly, cutting an arcuate cut 32 from between finger portion 26 and thumb portion 28 to side 18 of glove 10 adjacent the thumb portion 28.

It will be apparent to one skilled in the art, that the application of heat directly to thermoplastic sheet material 12 would result in thermoplastic 12 disintegrating. The addition of tissue sheet material 14 enables direct heat to be applied to form glove 10. The amount of heat required to seal sheet material 12 and 14 together depends upon the thickness of material used. By way of example, the applicant is presently using thermoplastic and tissue sheet material which are ½ of a millimetre in thickness. The heat applied to the described thickness of material is approximately 500 degrees fahrenheit. Prior to developing the apparatus which will be hereinafter described, proto-types where constructed by the applicant using a household clothes iron. Although the type of glove illustrated in the preferred embodiment is a mitten it will be apparent to one skilled in the art that gloves with separated digits can also be constructed by the described method. The mitten provides distinct advantages as there need only be small, medium and large sizes. Although the preferred embodiment has an arcuate cut to facilitate movement of the thumb, it will be apparent to one skilled in the art that by spreading the fingers a glove can be constructed with a web between the fingers which resembles and functions much like a baseball glove. If desired, the web between the digits could be cut to permit independent movement of each finger.

Figure 3:
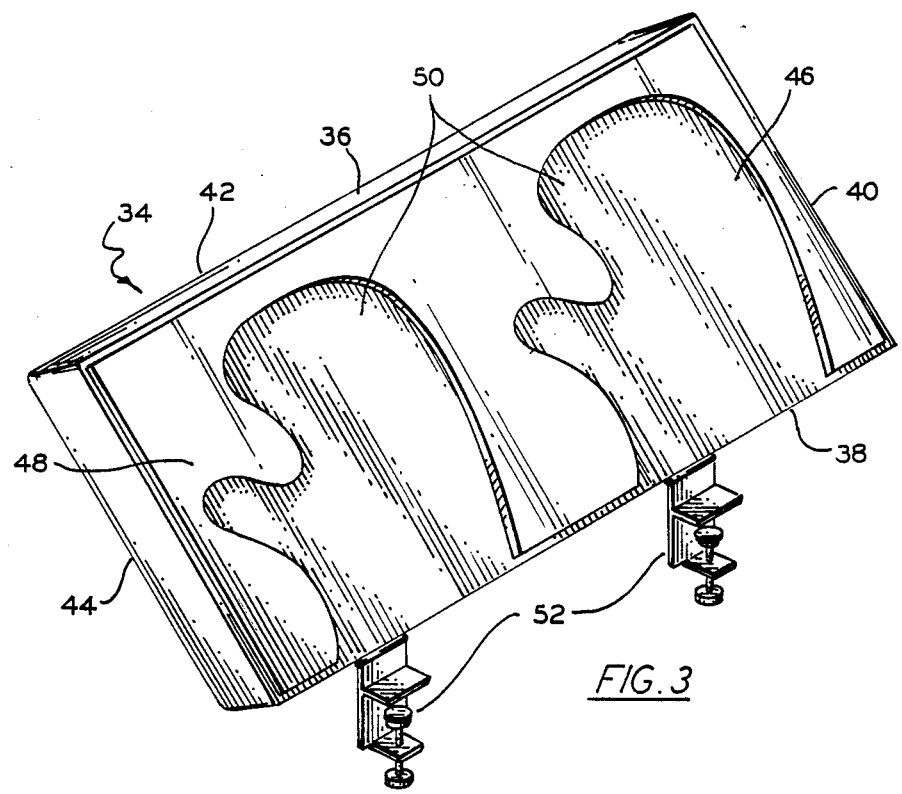
FIG. 3 is a perspective view of a preferred embodiment of an apparatus.
Figure 4:
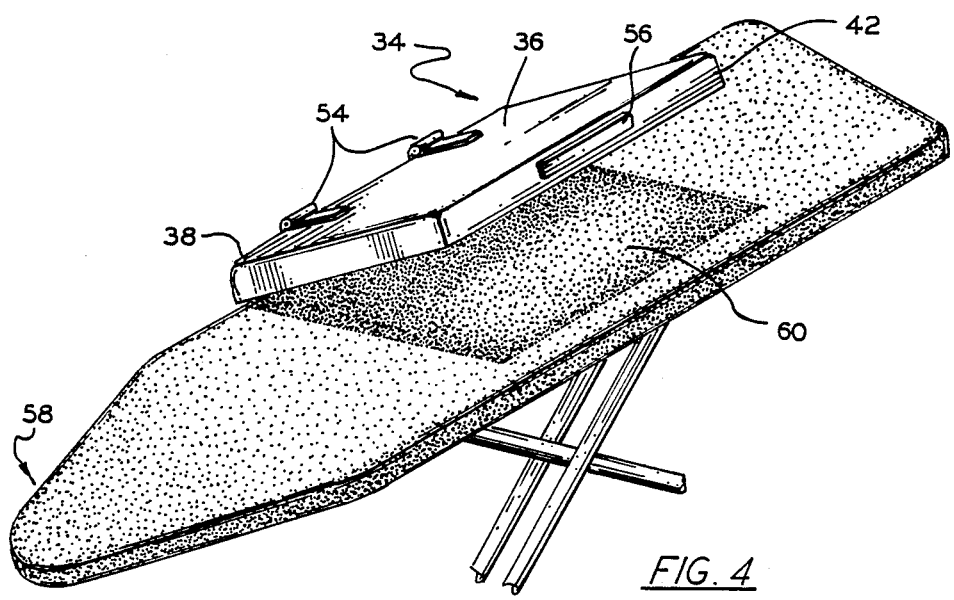
FIG. 4 is a perspective view illustrating the use of the apparatus of FIG. 3.

Apparatus 34 as illustrated in FIGS. 3 and 4 has as its primary component a rectangular body 36. For the purpose of this description the sides of rectangular body 36 shall be designated by reference numerals 38, 40, 42, and 44, and the face of body 36 shall be designated by reference numeral 46. A metal plate 48 is mounted to face 46 of body 36. Plate 48 has two openings 50, both of which are in the shape of a mitten. Although not visible in the illustrations, an electric heating element is positioned within plate 48, which, when connected to a power source, results in plate 48 being heated. "C" clamps 52 are attached by hinges 54 to side 38 of body 36. A handle 56 is attached to side 42 of body 36.

The operation of apparatus 34 will now be described with reference to FIGS. 3 and 4. In FIG. 3, apparatus 34 is shown as being attached to an ironing board with a thermally insulated cover, which has been designated by reference numeral 58. Ironing board 58 has a contact surface 60. In order to use apparatus 34, it must be attached by "C" clamps 52 to a base, such as ironing board 58. It is preferable if the base is thermally insulated so that it is not damaged by the application of heat. "C" clamps 52 are attached by hinges 54 to side 38 of body 36. Hinges 54 permit body 36 to be moved between a first position where the plate 48 engages surface 60 of ironing board 58, and a second position where plate 48 is spaced from surface 60 of ironing board 58. With body 36 in the second position, sheets of thermoplastic material 12 and sheets of tissue material 14 are placed on surface 60 of ironing board 58 directly below plate 48. As described in relation to the preferred method, sheet material 12 and 14 must be arranged such that there are two inner plys of thermoplastic 12 between outer plys of tissue 14. The electric element in plate 48 is then connected to a power source to heat plate 48, until plate 48 has reached sufficient heat to bond the thermoplastic material 12 with the tissue material 14. For example, a heat of 500 degrees fahrenheit is sufficient where the thickness of each ply of material is 0.5 of a millimetre, for a total thickness of 2 millimeters. Body 36 is moved to a first position, and maintained in position for 2 to 3 seconds. When in the first position plate 48 heat seals sheet materials 12 and 14. However, the openings 50 in plate 48 leave an unsealed pocket 15 between the plys thermoplastic sheet material 12 and an unsealed opening 30 along side 16 to permit hand entry.

The described apparatus was developed as an alternative to pressing the outline of a glove on sheet material 12 and 14 using an iron. It will be apparent to one skilled in the art that a similar result can be achieved by having two mating plates, and that there are numerous ways to mechanically arrange the movement of the plates between first and second positions. It will be apparent to one skilled in the art that instead of ironing board 58 an ordinary table may be used provided that it is protected by a thermally insulated pad where plate 48 contacts the table when body 36 in the first position.

Disposable glove 10 consists of two inner plys of thermoplastic sheet material 12 between outer plys of tissue sheet material 14. For the purpose of this description, the four sides of the rectangular sheet material illustrated shall be designated by numerals 16, 18, 20, and 22. Sheet material 12 and 14 are sealed together to form a pocket 15 with an unsealed opening 30 along side 16. Pocket 15 is in the outline of mitten 24 with a finger portion 26, and a thumb portion 28, as illustrated in FIG. 2. Glove 10 has a partially perforated arcuate cut 32 which extends from between finger portion 26 and thumb portion 28 to side 18 of glove 10 adjacent the thumb portion 28. A semi-circular configuration 62 is positioned at one end 64 of arcuate cut 32. Opening 30 has a first side 66 and a second side 68. The plys of sheet material 12 and 14 on first side 66 of opening 30 are longer than the plys of sheet material 12 and 14 on second side 68 of opening 30 forming an extension 67. The outline of a mitten 24 is marked in coloured ink on glove 10. The thermoplastic sheet material 12 visible on extension 67 is also coloured.

The operation of glove 10 will now be described with reference to FIG. 2. Although glove 10 is rectangular in appearance, unsealed opening 30 can easily be located with reference to the outline of mitten 24 marked in ink, and the coloration of extension 67. These features clearly indicate to the user the correct orientation of the glove. The user then grasps glove 10 by extension 67 and inserts his hand between the plys of thermoplastic sheet material 12. Extension 67 facilitates ease of hand entry into opening 30 as the user may grasp extension 67 to manipulate glove 10 into position and the difference in the length of sheet material 12 and 14 on sides 66 and 68 of opening 30 enables the user to easily part the plys of thermoplastic sheet material 12. Once glove 10 is in position on the users hand, with the user's thumb in thumb portion 28 and the user's fingers in finger portion 26, arcuate cut 32 permits the user full movement of his thumb. The semi-circular configuration 62 positioned at end 64 of arcuate cut 32 serves to prevent splitting of the sheet material 12 and 14 upon movement of the user's thumb.

It will be apparent to one skilled in the art various refinement which can be made to the invention which can not be illustrated in the drawings. The entry of the user's hand can be facilitated by placing a powder between the plys of thermoplastic sheet material 12. Tissue sheet material 14 which serves as the outer working surface of glove 10 can be specially adapted for particular tasks. Tissue 14 can be made of an absorbent material for delicate cleaning jobs, or abrasive material for use when scrubbing. It will further be apparent to one skilled in the art that one ply of tissue 14 can be made of absorbent material while the other ply of tissue 14 can be made of abrasive material to permit glove 10 to have multiple use. Tissue 14 can also be treated with a variety of chemicals to alter it's properties, as with a fire retardant for use when working with gasoline or other flamables.

Figure 5:
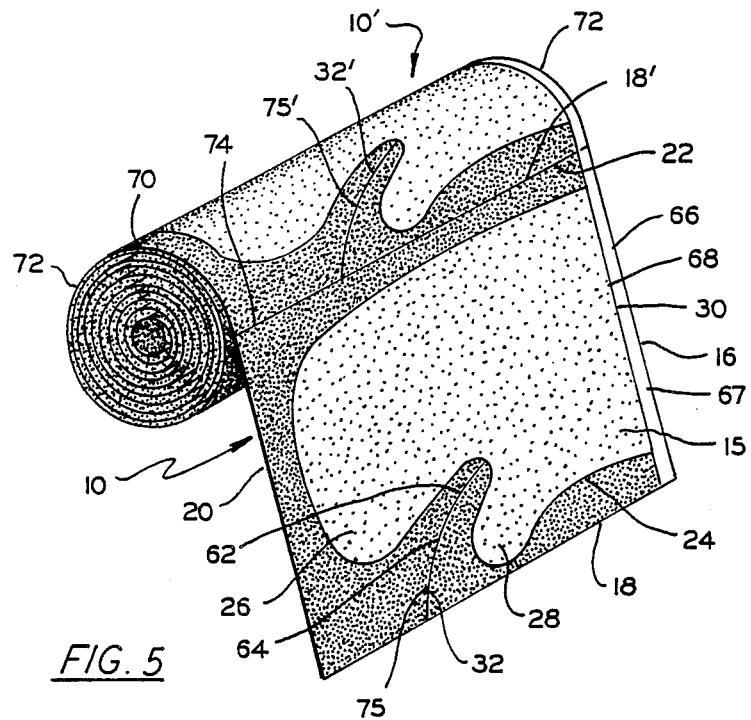
FIG. 5 is a perspective view of the disposable glove of FIG. 2, dispensed in rolls.

As illustrated in FIG. 5, disposable glove 10 may be dispensed in rolls 70 having opposed sides 72, by placing perforations 74 along sides 18 and 22. Side 16 of glove 10 along which opening 30 is positioned corresponds to one of sides 72 of roll 70. When so used it is preferable that arcuate cut 32 be joined with perforations 75 until separated by the user, and that arcuate cut 32 does not extend all the way to side 18 of sheet material 12 and 14.

When using a roll 70 containing a plurality of gloves 10, the user tears roll 70 along perforations 74 which connect side 22 of glove 10 with side 18 of glove 10'. Perforations 75' and the fact that arcuate cut 32' starts back from side 18', prevent tearing of arcuate cut 32' of glove 10' as glove 10 is separated. It should be noted that side 16 of glove 10 along which unsealed opening 30 is positioned is located along side 72 of roll 70. Once detached from the roll glove 10 is used as has previously been described.

Figure 6:
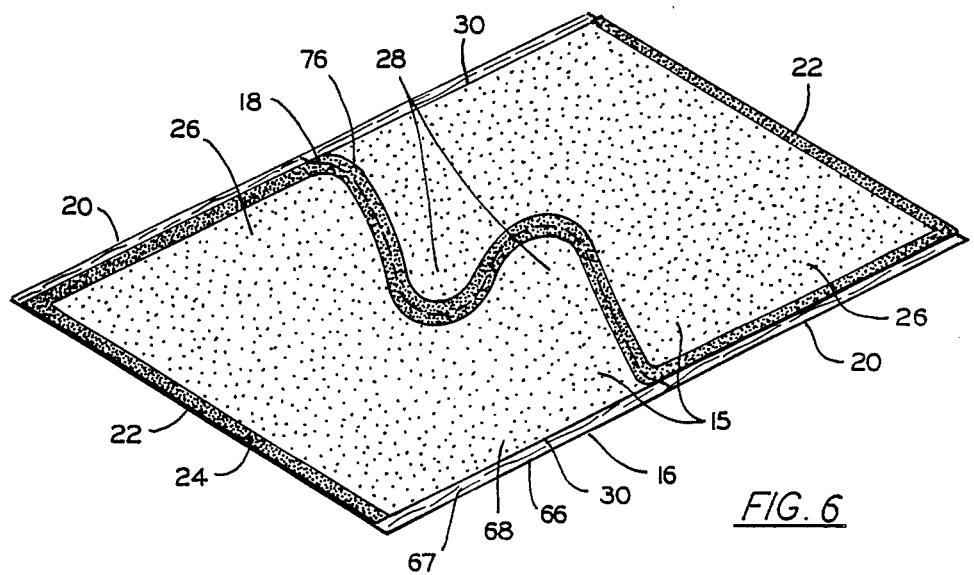
FIG. 6 is a perspective view of an alternate embodiment of the invention.

Gloves 10 may be dispensed in pairs. Dispensing gloves 10 in pairs enables the design of the gloves to be simplified and advantages to be obtained as will be hereinafter described. Referring to FIG. 6, two inner plys of thermoplastic sheet material 12 are arranged between outer plys of tissue sheet material 14. The plys of sheet material 12 and 14 are sealed together to form a pair of pockets 15 in the shape of mittens 24. Pocket 15 has a finger portion 26, and a thumb portion 28. The pair of mittens 24 are joined along side 18 with interlocking thumb portions 28 separated by perforations 76. Unsealed openings 30 are located along side 16 of sheet material 12 and 14 to permit hand entry into pockets 15. If it is desired to dispense the pair of mittens in rolls 70, each pair of mittens 24 are separated from an adjoining pair of mittens (not shown) by perforations 74 which are positioned along side 22. Side 16 of sheet material 12 and 14 having unsealed opening 30 must be positioned along sides 72 of roll 70.

When using a pair of gloves 10 dispensed in pairs, the user simply separates the pair along perforations 76. The use of the gloves 10 is then as has previously been described. If the pair of gloves 10 is dispensed from a roll 70, side 22 of one glove 10 of the pair is connected by perforations 74 to side 22 of another pair (not shown). The user merely tears a pair of gloves 10 from roll 70, and separates them for use as has previously been described.

It will be apparent to one skilled in the art that advantages may be obtained by dispensing gloves 10 in pairs with interlocking thumb portions 28 joined along side 18. Unrestricted use of the thumb is obtained merely be separating the pair of gloves along perforations 76. This means that arcuate cut 32 is notrequired, nor is semi-circular configuration 62. In addition, thumb portion 28 can be placed at an angle, which gives a greater range of movement to the thumb without as great a tendency for the material to tear. This is possible due to the fact that thumb portion 28 may extend beyond the usual width of glove 10.

It will be apparent to one skilled in the art that the development of a non-stick coating sold under the trademark "Teflon", makes possible the use of apparatus 34, with thermoplastic materials without an intervening layer of tissue. Such an apparatus would be more expensive, but would be identical to the described apparatus with, of course, the addition of a teflon coating on plate 48. Gloves made in this fashion would not be in accordance with the preferred method.

It will be apparent to one skilled in the art that two ply thermoplastic gloves made on a teflon coated version of apparatus 34 would provide beneficial results. However, even more beneficial results could be obtained if such gloves incorporated in their design some or all of the preferred features taught in this application. One feature readily adaptable to two ply thermoplastic gloves is having the glove in the form of a mitten with a thumb portion and a finger portion; and having a partially perforated arcuate cut from between the thumb portion and the finger portion to substantially the edge of the sheet material adjacent the thumb. Another feature readily adaptable to two ply thermoplastic gloves is having a semi-circular configuration at the end of the arcuate cut between the thumb portion and the finger portion, to prevent splitting of the sheet material upon movement of the thumb. Another feature readily adaptable to two ply thermoplastic gloves is having an opening with a first side and a second side, the ply of sheet material on the first side of the opening being longer than the ply of sheet material on the second side of the opening, thereby forming an extension which facilitates ease of hand entry into the opening. Another feature readily adaptable to two ply thermoplastic gloves is having a shape of a mitten marked on the outside of the glove, thereby clearly indicating to the user the correct orientation of the glove. Another feature readily adaptable to two ply thermoplastic gloves is having the sheet material being dispensed in rolls having opposed sides, the sheet material being connected by perforations along two opposed sides with the opening to each glove being along one of the opposed sides of the roll. Another preferred feature readily adaptable to two ply thermoplastic gloves is having a pair of mittens each of which has a thumb portion and a finger portion, the pair of mittens being joined along one side with interlocking thumb portions separated by perforations, each mitten having an openings to permit hand entry into the mitten. It will finally be apparent to one skilled in the art that further modifications may be made without departing from the scope of the invention.

The embodiments of the invention in which an exclusive property or privilege is claimed are defined as follows:

1. A disposable glove comprising:
   two plys of rectangular thermoplastic sheet material having four sides, the sheet material being sealed together to form a glove with an opening along one of the sides to permit hand entry, the glove being a mitten having a thumb portion and a finger portion, and having an arcuate cut extending from a side adjacent the thumb portion to between the thumb portion and the finger portion of the glove, thereby permitting the thumb portion and the material adjacent the thumb portion to be manipulated relative to the finger portion.

2. A disposable glove as defined in claim 1 the two plys of thermoplastic sheet material being between outer plys of tissue material.

3. A disposable glove as defined in claim 1, the arcuate cut being partially perforated with a plurality of uncut portions along the length of the cut.

4. A disposable glove as defined in claim 1, having a semi-circular configuration at the end of the arcuate cut, between the thumb portion and the finger portion, to prevent splitting of the sheet material upon movement of the thumb.

5. A disposable glove as defined in claim 1, the opening having a first side and a second side, the plys of sheet material on the first side of the opening being longer than the plys of sheet material on the second side of the opening, thereby forming an extension which facilitates ease of hand entry into the opening.

6. A disposable glove as defined in claim 5, the thermoplastic ply of the extension being coloured to identify the opening.

7. A disposable glove as defined in claim 1, having a shape of a mitten marked on the outside of the glove, thereby clearly indicating to the user the correct orientation of the glove.

8. A disposable glove as defined in claim 2, the ply of tissue being an absorbent material.

9. A disposable glove as defined in claim 2, the ply of tissue being an abrasive material.

10. A disposable glove as defined in claim 1, being dispensed in pairs, the thumbs of the pairs being interlocked and the openings of each mitt being opposed.

11. A disposable glove as defined in claim 2, being treated with a fire retardant.

12. A disposable glove as defined in claim 2, having powder between the plys of thermoplastic sheet material to facilitate hand entry.

13. A disposable glove, comprising:
   a. two plys of thermoplastic sheet material dispensed in a roll having opposed sides, the sheet material being sealed together to form a plurality of gloves, each glove having an opening along one of the opposed sides of the roll to permit hand entry, each glove being separated from an adjacent glove by perforations which extend between the opposed sides whereby the glove may be detached from the roll, the glove being a mitten having a thumb portion and a finger portion and having a partially perforated arcuate cut with a plurality of uncut portions along the length of the cut, spaced from the perforations which extend between the opposed sides and extending between the thumb portion and the finger portion of the glove, thereby permitting the thumb portion and the material adjacent the thumb portion to be manipulated relative to the finger portion after fracture of the uncut portions.

14. A disposable glove as defined in claim 13, having a semi-circular configuration at the end of the arcuate cut between the thumb portion and the finger portion, to prevent splitting of the sheet material upon movement of the thumb.

15. A disposable glove as defined in claim 13, the opening having a first side and a second side, the ply of sheet material on the first side of the opening being longer than the ply of sheet material on the second side of the opening, thereby forming an extension which facilitates ease of hand entry into the opening.

16. A disposable glove as defined in claim 13, having a shape of a mitten marked on the outside of the glove, thereby clearly indicating to the user the correct orientation of the glove.

17. A disposable glove as defined in claim 13, the two plys of thermoplastic sheet material being between outer plys of tissue material.

18. A disposable mitten, comprising:
   a. two plys of thermoplastic sheet material dispensed in a roll having opposed sides, the sheet material being sealed together to form a plurality of mittens, each mitten having an opening along one of the opposed sides of the roll to permit hand entry, each mitten being separated from an adjacent mitten by perforations which extend between the opposed sides of the roll whereby the mitten may be detached from the roll, the mitten having a thumb portion and a finger portion and having a partially perforated single cut, extending between the thumb portion and the finger portion, with a plurality of uncut portions along the length thereof, the cut being spaced from the perforations which extend between the opposed sides of the roll to prevent fracturing of the cut when detaching the mitten from the roll, and means at the end of the cut to prevent undesired splitting of the material, wherein once the uncut portions of the cut are fractured the thumb portion and the material adjacent the thumb portion can be manipulated relative to the finger portion.

* * * * *